United States Patent

[11] 3,607,170

[72] Inventor Jaromir Malesak
 Prague, Czechoslovakia
[21] Appl. No. 727,458
[22] Filed May 8, 1968
[45] Patented Sept. 21, 1971
[73] Assignee Statni Vyzkummy ustav sklarske techniky
 Prague, Czechoslovakia
[32] Priority May 20, 1967
[33] Czechoslovakia
[31] PV 3678-67

[54] METHOD AND APPARATUS FOR CONTINUOUSLY MANUFACTURING FOAM GLASS
 6 Claims, 4 Drawing Figs.
[52] U.S. Cl. .................................................. 65/22,
 65/32, 65/141, 65/157, 263/15
[51] Int. Cl. ........................................................ C03b 19/08
[50] Field of Search ............................................ 65/22, 32,
 157, 137, 337, 335, 141; 161/193; 263/15

[56] References Cited
 UNITED STATES PATENTS
 2,322,581 6/1943 Lytle ............................. 65/22
 2,354,807 8/1944 Fox ............................... 65/22
 2,937,938 4/1960 Fiedler .......................... 65/22
 3,300,289 1/1967 Long .............................. 65/22
 3,361,550 1/1968 Murphy ......................... 65/22

*Primary Examiner*—S. Leon Bashore
*Assistant Examiner*—Robert L. Lindsay, Jr.
*Attorney*—Richard Low ABSTRACT: A method and apparatus for manufacturing foam glass from a mixture of glass powder and a foaming agent. The mixture is initially preheated in a nonoxidizing atmosphere while being advanced in a given direction through a preheating zone of a tunnel kiln. The nonoxidizing atmosphere in the preheating zone of the tunnel kiln is withdrawn from the latter in countercurrent to the direction of movement of the mixture therethrough, and nonoxidizing burning takes place through burners capable of carrying out nonoxidizing burning in the immediate vicinity of the region where the mixture of glass powder and foaming agent is initially delivered to a conveyor band which conveys the mixture through the preheating zone to be received thereafter in a foaming zone. The kiln preferably includes a partition means situated between the preheating and foaming zones and at the inlet of the kiln there is a discharge outlet through which the atmosphere of the preheating zone is withdrawn. A supply means extends downwardly through the discharge outlet to supply the mixture to the conveyor band.

Jaromír Malešák
INVENTOR.

METHOD AND APPARATUS FOR CONTINUOUSLY MANUFACTURING FOAM GLASS

BACKGROUND OF THE INVENTION

The present invention relates to the continuous manufacture of lengths of foam glass from a mixture of glass powder and a foaming agent.

Such a mixture is conventionally supplied from a suitable storage bin onto a conveyor band which conveys the mixture through a tunnel kiln where the mixture is heated in such a way that it will first sinter, and then fuse and start foaming. Then, the foam glass after being shaped to a suitable cross section is stabilized by being tempered.

With methods and apparatus of this latter type it is important, since the foam glass is formed without molds, to maintain around the mixture of glass powder and foaming agent during the preheating thereof, prior to sintering, a nonoxidizing atmosphere inasmuch as an oxidizing atmosphere would result in burning of the carbon contained in the foaming agent. In this latter event, there will be either no foaming of the mixture or a foam glass of exceedingly inferior quality will result.

In order to achieve a nonoxidizing atmosphere in the preheating zone of the tunnel kiln it has already been proposed to provide injections of crude oil into the kiln space. As a result, large amounts of soot are spread in the space around the kiln. It has also been proposed to apply to the surface of the mixture a protective coating which contains carbon, but such a protective coating has proved by experience not to be capable of preventing the penetration of the oxidizing atmosphere through cracks in the surface which are created during the course of sintering of the mixture.

Also, it has been proposed to use burners which are capable of carrying out a nonoxidizing burning, but this latter expedient, too, has not fully removed the difficulties. With known methods and apparatus of this type, the mixture is supplied to the conveyor in front of the kiln, and even if there is an almost perfect sealing of the inlet opening where the conveyor with the mixture of glass powder and foaming agent enters into the kiln space, the penetration of the ambient oxidizing atmosphere into the interior of the kiln cannot be avoided.

SUMMARY OF THE INVENTION

It is accordingly a primary object of the present invention to provide a method and apparatus which will avoid the above mentioned drawbacks.

In particular, it is an object of the present invention to reliably maintain about the mixture of glass powder and foaming agent in the preheating zone a nonoxidizing atmosphere which by contacting the mixture prior to the sintering thereof will prevent any undesirable burning of the carbon in the foaming agent.

One object of the invention is to provide a construction and method of the referred to type which are capable of maintaining a nonoxidizing atmosphere directly at the inlet of the kiln, so that the surface of the mixture at the entrance to the kiln is effectively surrounded by a nonoxidizing atmosphere to prevent the burning of carbon in the foaming agent.

Another object of the invention is to provide a method and apparatus according to which, by reason of the reliable maintenance of the nonoxidizing atmosphere at the entrance into the kiln and in the preheating zone thereof, it becomes possible to accelerate the process and to shorten the kiln, so that in this way a larger output can be achieved with a smaller apparatus and with smaller expenditure of power.

In accordance with the invention not only is a nonoxidizing atmosphere maintained in the preheating zone of the kiln, but in addition this atmosphere is withdrawn out of the kiln through a discharge outlet thereof which is situated at the inlet of the kiln so that the nonoxidizing atmosphere is withdrawn from the preheating zone of the kiln in countercurrent to the movement of the mixture of powder glass and foaming agent into the kiln. A supply means supplies the mixture to the inlet of the preheating zone directly through the discharge outlet through which the nonoxidizing atmosphere is withdrawn, and a partition means is provided to separate the preheating zone from the subsequent foaming zone of the kiln. An additional burner means, capable of providing a nonoxidizing burning, is situated across the conveyor directly at the inlet opening of the kiln so that the surface of the mixture initially reaching the conveyor is surrounded by the nonoxidizing atmosphere. Thus, the arrangement of an additional burner capable of providing nonoxidizing burning near the inlet of the kiln and extending across and transversely of the direction of movement of the conveyor for the mixture provides at the inlet a screen of nonoxidizing atmosphere preventing penetration of the surrounding air to the surface of the mixture. Furthermore, a superior seal is achieved at the inlet opening inasmuch as only the conveyor passes through this opening without the mixture thereon, the mixture being supplied to the conveyor just inside of the inlet opening of the kiln. The partition wall means makes it easier to maintain the nonoxidizing atmosphere in the preheating zone of the kiln.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
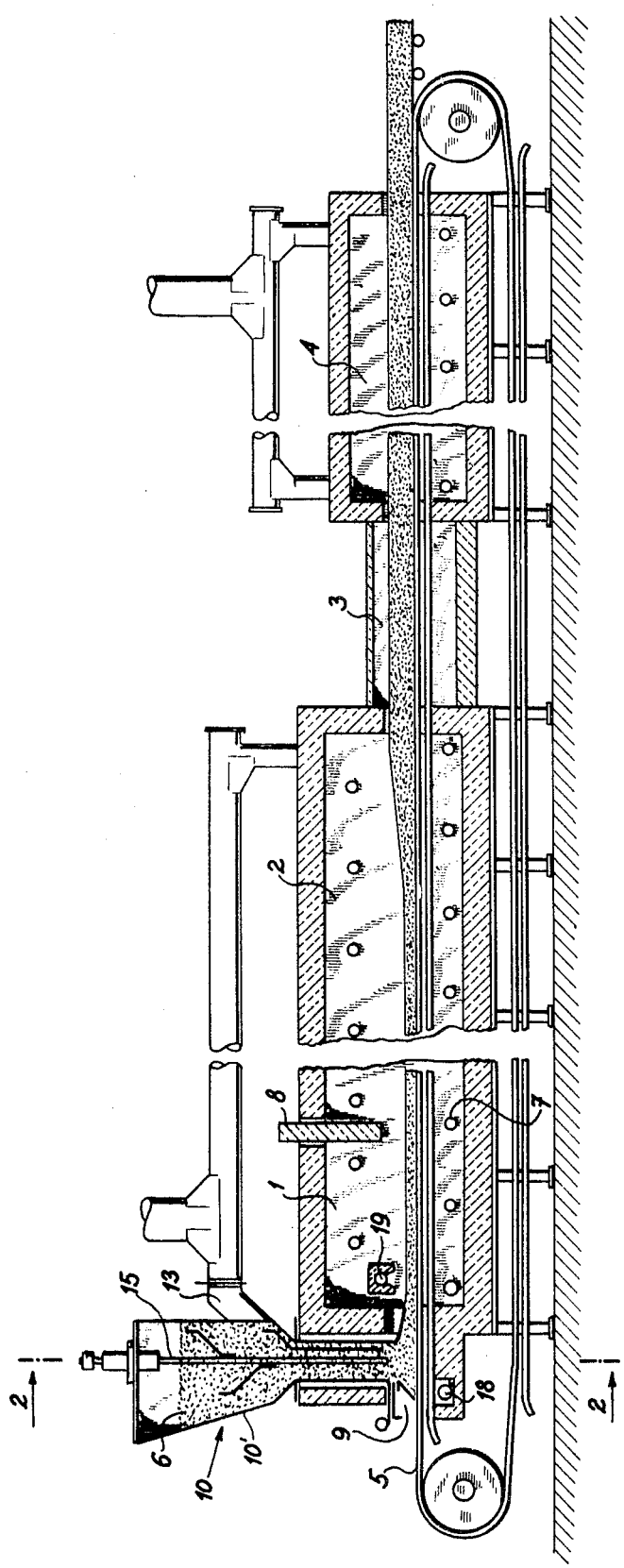
FIG. 1 is a schematic partially sectioned longitudinal elevation of a kiln provided with the features of the present invention to carry out the process thereof.

Referring initially to FIG. 1, it will be seen that the mixture 6 of glass powder and foaming agent is conveyed through the illustrated tunnel kiln on the upper run of an elongated endless conveyor band 5. The tunnel kiln has an initial preheating zone 1 followed by a foaming zone 2. This latter zone is followed by a stabilizing zone 4 in which the foam glass is tempered. Heating of the interior of the kiln is brought about by a plurality of burner installations 7, and those burner installations 7 which are situated at the preheating zone 1 form a burner means for providing in the preheating zone nonoxidizing burning. A partition wall means 8 is situated between and separates the preheating zone 1 from the foaming zone 2.

A supply means 10 is provided for supplying the mixture of glass powder and foaming agent into the kiln directly behind an inlet opening 9 thereof through which the upper run of the band 5 enters into the kiln without any of the mixture thereon. In the region of its inlet opening 9 the kiln is formed with a discharge outlet 12 (see FIG. 2) through which the nonoxidizing atmosphere is withdrawn from the preheating zone 1. A suction conduit means 13 communicates with the discharge outlet 12 for this purpose. The supply means 10 includes, in addition to the hopper 10' in which the mixture 6 is initially located, a plurality of tubes 11 all extending downwardly from the hopper 10' and passing through the interior of the discharge outlet 12 where the tubes 11 are connected to and communicate with a downwardly directed discharge mouth 14 having the shape of an elongated inverted trough which extends across the upper run of the band 5. The height of the discharge mouth 14 from the upwardly directed surface of the upper run of the conveyor 5 is adjustable in any known way.

Figure 2:
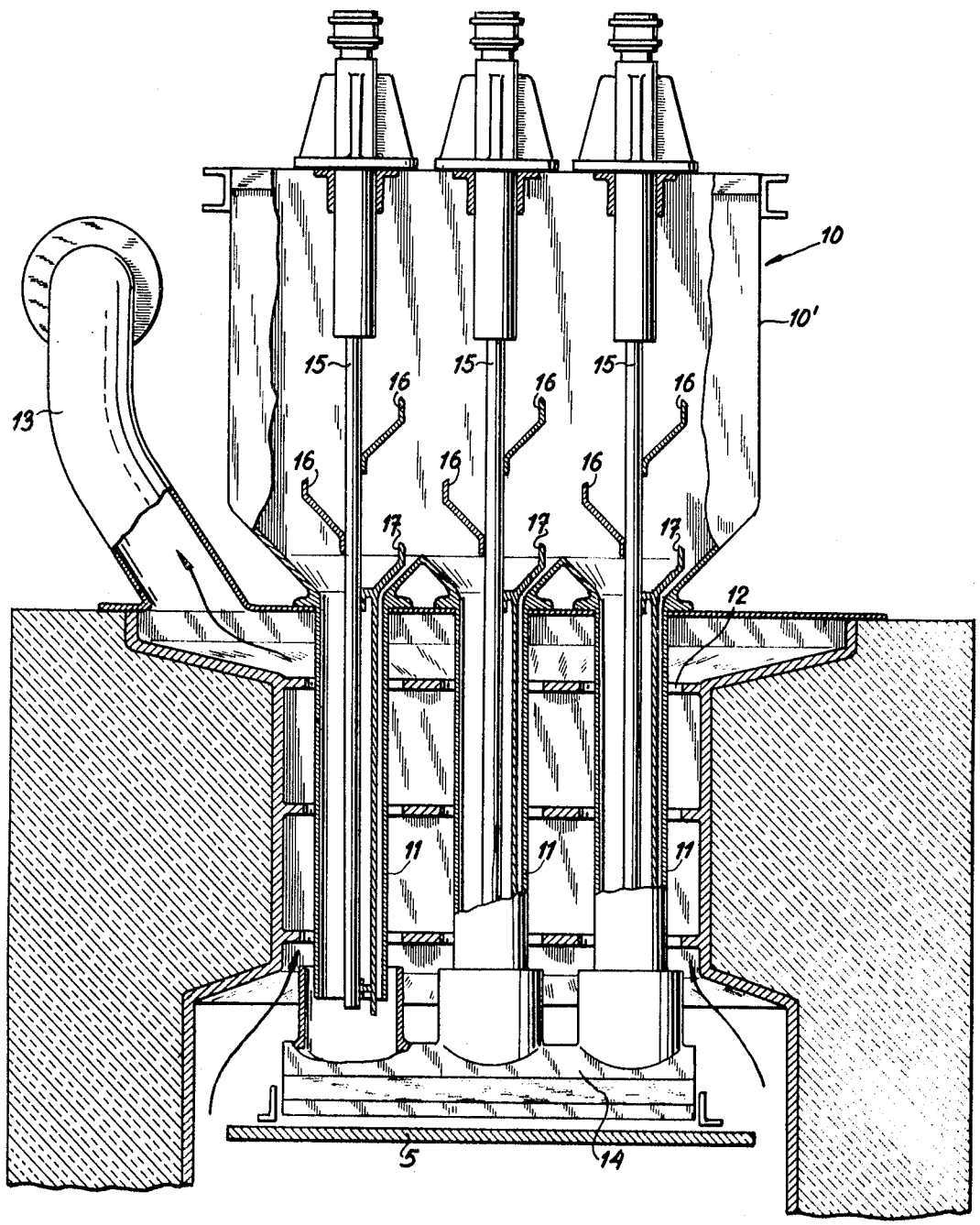
FIG. 2 is a schematic partially sectioned illustration, the section being taken transversely across the kiln in the plane of the line 2—2 of FIG. 1 and showing details of the supply means and discharge outlet for the preheating zone of the kiln.

Having now reference to FIG. 2, the supply means includes further a plurality of rotary shafts 15 which extend downwardly through the hopper 10' and along the interiors of the tubes 11. These shafts are rotated as by any suitable motor, gear, or other drives connected to the upper end portions of the shafts, which extend through suitable bearings, the driving components being shown schematically at the top of FIG.

2. Within the hopper 10' common to all of the tubes 11, the several shafts 15 fixedly carry suitable blades 16 which turn with the shafts 15, while the shafts 15 within the tubes 11 fixedly carry elongated fin-shaped wipers 17 which slide against the inner surfaces of the tubes 11. Thus, the rotary blades 16 will have a stirring effect and will prevent the formation of any undesirable cavities in the mixture within the hopper 10', while the wipers 17 will prevent any undesirable clinging of the mixture to the inner surface of the tubes 11.

Figure 3:
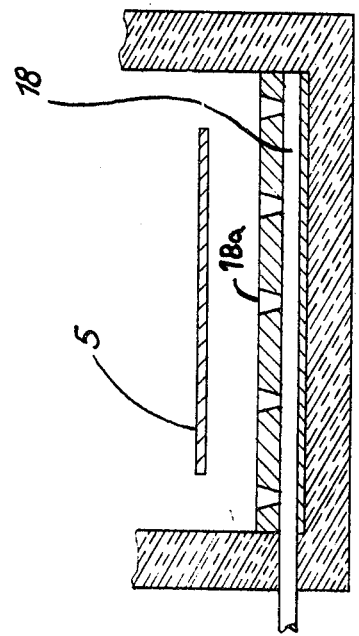
FIGS. 3 and 4 are enlarged detailed views of burner elements employed in the kiln.

An additional burner means 18 (FIG. 1) is situated in the region of the inlet opening 9 at a location in advance of the entrance of the mixture and just beneath the upper run of the band 5 where it initially moves into the inlet opening 9. This additional burner means 18 which also provides nonoxidizing burning has as seen in FIG. 3 an upwardly directed mouth 18a extending across the conveyor band 5 transversely to the direction of its movement.

Figure 4:
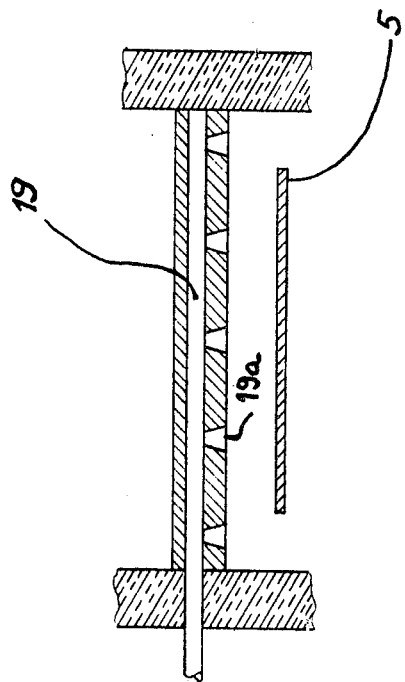

Within the preheating zone 1 there is a further burner means 19 situated next to the discharge mouth 14 of the supply means and also extending across the conveyor band 5 transversely to the direction of movement thereof. The burner means 19 has as seen in FIG. 4, a downwardly directed mouth 19a and is situated above the conveyor band 5 as shown in FIG. 1. The burner means 19 also ensures nonoxidizing burning.

The mixture of glass powder and foaming agent will flow by gravity downwardly along the supply means 10 through the tubes thereof, with the rotary blades 16 preventing any cavities in the mixture and with the wipers 17 preventing any sticking of the mixture to the interior surfaces of the tubes 11. The mixture will thus be delivered onto the upper run of the conveyor band 5 just inside of the outer extremity of said inlet opening 9 to be conveyed away from the supply means 10 and along the interior of the preheating zone 1 before being further advanced through the foaming zone 2, the cooling zone 3, and the stabilizing zone 4. The amount of mixture which is introduced into the kiln depends upon the speed of movement of the conveyor and the adjustment of the discharge mouth 14 of the supply means 10.

Through the discharge outlet 12 of the kiln, the nonoxidizing atmosphere within the preheating zone is discharged out of the latter in countercurrent to the movement of the mixture, the atmosphere in the preheating zone being made up of the products of combustion from the nonoxidizing burners 7, 18 and 19 which are situated at the preheating zone. It is to be noted that the additional burner means 18 and 19 not only serve to maintain the nonoxidizing atmosphere but in addition preheat the mixture in the tubes 11 and surround the mixture leaving the mouth 14 and engaging the conveyor 5 with a nonoxidizing atmosphere to thus effectively prevent any burning of the foaming agent. Simultaneously with these operations, the products of combustion of the outermost burner means 18 create a screen which prevents penetration of the surrounding air into the preheating zone 1. The burner means 19, on the other hand, causes a sintering of the surface of the mixture which has advanced just beyond the discharge mouth 14 and thus creates where necessary a protective layer which will prevent penetration of the kiln atmosphere into the interior of the mixture.

The mixture 6 is treated on the conveyor means 5 so that in a known way it will first sinter, then fuse, and then start to foam. Thus, the volume of the mixture will increase. After shaping the foaming mixture, in a known way, the length of foam glass which is continuously manufactured is cooled at its exterior surface, and then suitable tempering is carried out in the stabilizing zone 4.

Obviously, many other modifications and variations of the present invention are possible in the light of the above teachings. It is, therefore, to be understood that, within the scope of the appended claims, the invention may be practiced otherwise than as specifically described.

I claim:

1. In an apparatus for continuously manufacturing foam glass from a mixture of glass powder and a foaming agent, an elongated tunnel kiln having an inlet end; means defining a preheating zone at said inlet end, means defining a foaming zone following said preheating zone; means defining a cooling zone; means defining a tempering zone; elongated conveyor means extending through said inlet end along said zones for conveying said mixture through said zones; burner means located at said preheating zone for carrying out burning in a nonoxidizing atmosphere in said preheating zone; and supply means situated at said inlet end for supplying said mixture on to said conveyor means, the improvement comprising a vertical discharge outlet at the inlet end of said kiln, suction means for exhausting nonoxidizing atmosphere from said preheating zone, upwardly through said discharge outlet, said supply means extending downwardly through said discharge outlet, said supply means extending downwardly through said discharge outlet for supplying said mixture onto said conveyor band at said inlet end countercurrent to said exhausting gas and additional burner means at said inlet end for causing nonoxidizing burning; said additional burner means extending across said conveyor band directly beneath an upper run thereof which receives said mixture, said additional burner means having an upwardly directed burner mouth.

2. The combination of claim 1 and wherein said supply means includes at least one supply tube extending through said discharge outlet of said kiln, a hopper communicating with the top end of said supply tube, an elongated rotary shaft extending downwardly through said hopper and along the interior of said tube and carrying wipers in said tube for wiping the interior surface thereof, and blades in said hopper for stirring the mixture in said hopper.

3. The combination of claim 2 and wherein said tube terminates at its bottom end in a discharge mouth through which the mixture flows onto said conveyor band, and a further burner means is located closely adjacent to said mouth over said conveyor band for providing nonoxidizing burning, said further burner means also extending transversely across said conveyor band, and having a downwardly directed burner mouth.

4. The combination of claim 3 and wherein said supply means includes a plurality of said tubes having a common hopper said tubes being situated beside each other in said discharge outlet of said tunnel kiln, a rotary shaft being situated in each of said plurality of tubes carrying wipers in said tubes and blades in said hopper.

5. The combination of claim 1 including partition means between said preheating and foaming zones, and means for vertically adjusting said partition above the upper run of said conveyor.

6. In a method for the continuous manufacture, in a tunnel kiln, of a length of foam glass from a mixture of glass powder and a foaming agent, comprising passing said mixture through a preheating zone heated by burning a combustible mixture producing nonoxidizing waste gases then feeding said mixture onto a conveyor in said kiln, and heating said mixture to a temperature so that the mixture first sinters then fuses and foams, the improvement comprising, feeding said mixture downwardly through said preheating zone, to the inlet of said kiln, passing the exhausted streams of waste gases produced by nonoxidizing burning upwardly about said mixture and countercurrent to the direction of feed maintaining said streams of gases out of direct contact with said mixture in said preheating zone and until it reaches the conveyor, said mixture being heated by said gases without oxidizing.